3,157,521
Patented Nov. 17, 1964

3,157,521
INFRARED LENS CEMENT

Donald S. Cary, William F. Parsons, and Edward Carnall, Rochester, N.Y., assignors to Eastman Kodak Company, Rochester, N.Y., a corporation of New Jersey
No Drawing. Filed Dec. 6, 1952, Ser. No. 324,605
3 Claims. (Cl. 106—47)

This invention relates to infrared transmitting glass and adhesive therefor formed by melting selenium and sulfur in the proper proportions. Arsenic, boron, phosphorus or silicon in elemental form or as oxides or sulfides may be added to the mixture to prevent crystallization.

In the production of compound lenses as well as in other forms of optical elements which comprise two or more optical components, it has been customary to seal the components together in order ot prevent the loss of light which would occur without the presence of the cementing agent. In order to achieve maximum light transmission, the cementing material should have an index of refraction equal to or near the index of refraction of at least one component of the optical element. In other words, if the components of the optical element be made of glass, it is desirable that the cementing material have an index of refraction equal to or near that of at least one of the glass components which are to be cemented together. Where glasses of different indices are used in the element, it often is desirable that the cementing material have an index or refraction between the indices of refraction of the two components of the optical element. Most of the cementing agents which have the other required characteristics for this purpose do not have an index of refraction sufficiently high to match or approximate that of infrared transmitting glasses.

Cementing agents for the different components of optical elements should have good adhesion to glass or to any other substance of which the element may be made, they should be clear and transparent, they should contain no volatile material after cementing, and they should be materials which will set or cure to a solid. Furthermore, the cementing agents should be generally insoluble and preferably infusible. Many of the products previously proposed are lacking in one or more of these properties or have other deficiencies. Some resinous materials which might be suitable for this purpose require the use of a volatile solvent which leaves a residue behind and frequently causes the formation of unacceptable voids in the film of adhesive cement, particularly if the optical element is exposed to high temperatures such as those encountered in tropical conditions or when a lens is exposed to sun light or arc lights for a relatively long period of time or in unusual circumstances found in industry and in war.

It is often desirable to join infrared transmitting glasses with an infrared transmitting cement. It is also often desirable to join an infrared transmitting glass with a device which is infrared sensitive. For example, one might want to join arsenic trisulfide which is an infrared transmitting glass with an infrared sensitive layer of lead sulfide. However, all the well-known transmitting glasses such as germanium, selenium, silicon, arsenic trisulfide, and the like have high refractive indices, in general, above 2. For this reason, a good infrared transmitting glass adhesive also should have a high index (i.e. in the range of two or more) as well as low absorption in the infrared. In addition to these optical properties, such an adhesive should be easy to work with and should establish firm bonds with infrared transmitting glasses. These bonds should retain their strength over wide temperature ranges and the cement itself should resist changes in structure and chemical composition. In view of the diversity of the foregoing requirements it is obvious that any adhesive providing all of the above listed desirable characteristics would be of great value.

The primary object of this invention is to supply an adhesive which, judged by the above criteria, provides a suitable cement for infrared transmitting glasses. Another object of this invention is to supply a lens cement for infrared transmitting glasses which has a refractive index above 2. A further object of this invention is to provide an adhesive for infrared transmitting glass which resists the usual strong tendencies of such adhesives to crystallize on standing or at elevated temperatures. Another object of this invention is to furnish a lens cement for infrared transmitting glass which is inorganic in its chemical compositon and which has low absorption in the infrared.

An adhesive which would satisfy the above rigid requirements must also be substantially free of absorption bands in the infrared and must become fluid at a relative low temperature. We have found a sulfur-selenium adhesive to meet quite well these requirements. Selenium starts to soften at 50° to 60° C., but it does not become completely fluid until a temperature of approximately 220° C. is reached. The slope of its softening curve vs. temperature is so low that it is not practical as an adhesive, but it has been found that sulfur, which belongs to the same chemical family as selenium, modifies the properties of selenium to such an extent that a very useful and novel thermoplastic material results. However, since such a sulfur and selenium mixture exhibits tendencies to crystallize on standing or at elevated temperatures we found it desirable to render the sulfur and selenium ions sufficiently immobile that they could not reorient themselves in their positions in the vitreous state to the ordered positions characteristic of a crystal. We have discovered that ions of the noble gas structure such as B, P, and Si, in the form of oxides or sulfides may be used to inhibit crystallization. Arsenic may also be added to the B, P, and Si group in some cases. In fact, insofar as the arrangement of their planetary electrons is concerned, arsenic differs only from phosphorus in that its M shell is completed, and has five electrons in its N shell whereas P has five electrons in its M shell. We have found further that arsenic, when added to the sulfur selenium mixture as arsenic trisulfide, either eliminates or greatly reduces crystallization.

The above mixtures have high refractive indices and transmission measurements show that there is no appreciable absorption in the cement layers over a wave length of 1 to 13 microns.

Optical flats joined with the sulfur-selenium-arsenic trisulfide cement have been cold tested as low as —65° F. and as high as 160° F. for long periods with successful results.

The following examples in which the proportions are in parts by weight are given by way of illustration and not in a limiting sense.

Example 1

5.4 parts by weight of finely divided selenium were completely mixed with one part of finely divided sulfur and the mixture heated to between 250° and 300° C. and the melt stirred until a homogeneous mixture was achieved. This mixture was then cooled and the resulting clear, deep red solid used as an adhesive.

Pieces of glass were heated to between 80 and 100° C. and a small portion of the cement melted onto one of the glass surfaces—then the pieces were joined and the cement pressed to a thin uniform layer. The resulting assembly was found to have excellent infrared transmitting properties.

Example 2

5.4 parts by weight of finely divided selenium were mixed with one part of finely divided sulfur, and a quantity of finely divided boric oxide in the amount of 1% of the weight of the sulfur-selenium mixture added. This mixture was melted as in Example 1 and used to cement sample pieces of glass in a manner identical to Example 1. Good infrared transmitting properties were found to be possessed by the assembly.

*Example 3*

5.4 parts by weight of finely divided selenium were completely mixed with one part of finely divided sulfur and a quantity of finely divided arsenic trisulfide in the amount of 2% of the weight of the sulfur-selenium mixture added. This mixture was melted as in Example 1 and used to cement sample pieces of glass in the manner of Example 1 and with similar results.

The proportions described in the above examples are merely illustrative and may be varied. Similarly, other materials beside $B_2O_3$ and $As_2S_3$ may be added, including all compatible materials of the nature of sulfides and oxides of boron, silicon, phosphorus and arsenic.

We claim:

1. An infrared transmitting adhesive for glass and the like having high infrared transmitting efficiency, excellent adhesive affinity for infrared transmitting glass surfaces, freedom from volatile residues, and freedom from substantial physical changes over a wide range of temperatures, consisting essentially of about 1 part of sulfur, about 5.4 parts of selenium and about 1–2%, based on the combined weights of the sulfur and selenium, of a crystallization inhibitor selected from the group consisting of the oxides and sulfides of boron, phosphorus, silicon and arsenic, the ingredients being combined in a uniform, vitreous composition.

2. An infrared transmitting lens cement consisting essentially of about 1 part of sulfur and about 5.4 parts of selenium and a quantity of boric oxide equal in weight to about 1% of the weight of the sulfur-selenium mixture, the ingredients being combined in a uniform, vitreous composition.

3. An infrared transmitting lens cement consisting essentially of about 1 part sulfur and about 5.4 parts of selenium and a quantity of arsenic trisulfide in an amount equal to about 2% of the weight of the sulfur-selenium mixture, the ingredients being combined in a uniform, vitreous composition.

References Cited by the Examiner
UNITED STATES PATENTS

| | | | |
|---|---|---|---|
| 1,761,740 | 6/30 | Nordlander | 106—70 X |
| 1,981,232 | 11/34 | Hamor et al. | 106—70 |
| 2,085,437 | 6/37 | Michelssen | 88—57 |
| 2,280,301 | 4/42 | Ray | 106—70 |
| 2,512,257 | 6/50 | Pfund | 88—57 |

TOBIAS E. LEVOW, *Primary Examiner.*

JOSEPH E. GONSALVES, WILLIAM G. WILES, CARL D. QUARFORTH, *Examiners.*